March 6, 1928.

J. P. GRIGGS 1,661,893

GOLF BALL WINDING MACHINE

Filed Sept. 30, 1926

INVENTOR
Joseph P. Griggs,
BY
R. P. Trogner
ATTORNEY

Patented Mar. 6, 1928.

1,661,893

UNITED STATES PATENT OFFICE.

JOSEPH P. GRIGGS, OF AKRON, OHIO, ASSIGNOR TO THE GOODYEAR TIRE & RUBBER COMPANY, OF AKRON, OHIO, A CORPORATION OF OHIO.

GOLF-BALL-WINDING MACHINE.

Application filed September 30, 1926. Serial No. 138,714.

My invention relates to winding machines and it has particular reference to a machine for winding spheroids, such, for example, as golf balls, having a body portion of rubber thread.

Golf balls are customarily made with a center or core about which is wound a mass of rubber threads that are subsequently enclosed within a gutta percha shell. The assembling operation has been accomplished by manually wrapping a soft center member with broad bands of rubber tape, until the core thus formed had a requisite hardness, and then applying by machine a winding of tensioned rubber thread. Certain types of machines employed for this purpose were provided with ball supporting rollers that were given an irregular lateral vibratory motion by means of springs. Such machines developed a winding that usually presented a greater thread density about certain axes or zones, and hence, produced a ball that was somewhat ellipsoidal or out of round.

It is the primary object of the invention to provide a winding machine wherein the core will be so rotated during the winding thereof as to produce a substantially spheroidal ball. It is also an object of the invention to provide a machine that will consistently avoid the formation of zones of excessive thickness, and which will provide a true criss-cross or ramble winding as distinguished from a rosebud or polar winding.

Various other objects, and the advantages to be derived from a practice of the invention, will become apparent from a perusal of the following description of a machine embodying the principles thereof, illustrated in the accompanying drawing, wherein.

Figure 1:
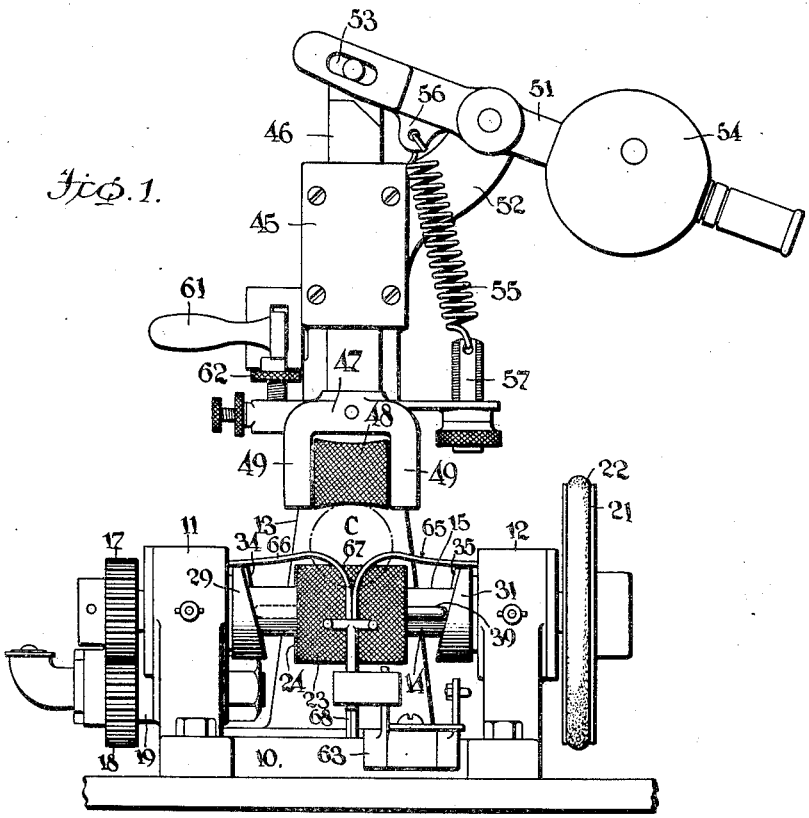
Fig. 1 is a front elevational view of a winding machine.
Figure 2:
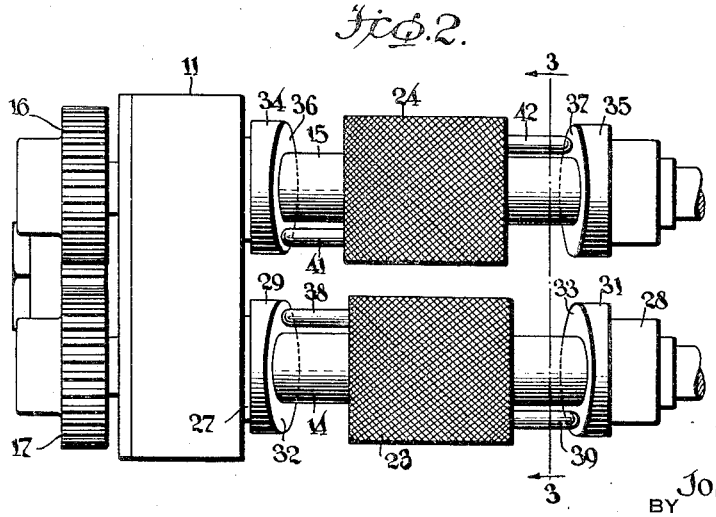
Fig. 2 is a fragmentary plan view of the ball supporting rollers.

The machine comprises a base frame 10, at the opposite sides of which are formed journal boxes 11 and 12, and at the rear of which is positioned an upwardly extending frame member 13. The members 11 and 12 have pairs of horizontally aligned bearings disposed therein, for the reception of shafts 14 and 15, having gear wheels 16 and 17, which are the same size throughout, respectively keyed to the ends thereof adjacent the journal box 11. A third gear wheel 18 is also mounted upon the member 11, by means of a stub shaft 19, and it intermeshes with the gears 16 and 17 to effect a revolution of the shafts 14 and 15 in the same direction and with equal angular velocities. A pulley 21 is keyed to the end of the shaft 15 adjacent the bearing member 12, for the reception of a driving belt 22, by means of which power is delivered to the shafts.

Ball supporting rollers 23 and 24, cylindrical in shape and provided with knurled surfaces, are respectively mounted upon the shafts 14 and 15, and they are slidably secured thereto by means of keys 25 and 26. These members insure the rotation of the rollers 23 and 24 with the shafts 14 and 15, and they permit them to slide longitudinally thereof during the rotary movement. A pair of bushings 27 and 28 that have similarly formed cam members 29 and 31 disposed at their inner ends are arranged in concentric relation with the shaft 14, and are supported within the bearing members 11 and 12. These members are provided with tapered cam faces 32 and 33, that converge toward the base frame 10, and which are spaced a maximum distance at their upper traces.

A pair of equi-dimensioned cam members 34 and 35 are positioned in a similar manner around the shaft 15, and they are likewise provided with divergent tapered cam faces 36 and 37. The lowermost and innermost points of the pair of cam members 29 and 34, and the pair of cam members 31 and 35, lie in parallel planes, and hence, at these points, the distances between the members 29 and 31 and the members 34 and 35 are equal. However, the inclination of the tapered faces 32 and 33 is greater than the inclination of the faces 36 and 37, and hence, there is a greater linear distance, at other angular positions, between the pair of cams 29 and 31 than between the pair of cams 34 and 35. This construction permits the rollers 23 and 24 to have unequal linear displacements, the effect of which will be described more specifically hereinafter.

It may be noted, that in actual practice for a golf ball winding machine, inclinations of about 15° for the cam members 29 and 31, and 17° for the cam members 34 and 35, have been found to give satisfactory results. It will be seen, therefore, that the numerical difference in displacements may be small, but that it is positive.

Figure 3:
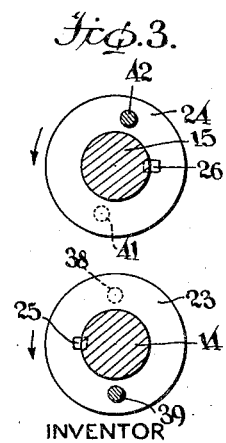
Fig. 3 is a projected view of the rollers taken along the line 3—3 of Fig. 2.

A pair of cam pins 38 and 39, rigidly secured to and projecting from the opposite ends of the roller 23, respectively contact at all times with the cam faces 32 and 33, and they are disposed to each other at an angle of 180°. Cam pins 41 and 42, projecting from the opposite ends of the roller 24, and also spaced at an angle of 180°, contact respectively with the cam faces 36 and 37. Preferably, the planes determined by the respective pairs of pins are mutually inclined, so that the pins adjacent either journal box 11 or 12 are disposed at an angle equal to 180° plus or minus about 15°. Thus, when the pins are in the position illustrated in Fig. 3, pin 39 leads pin 42 by about 195°.

It will be observed that, as the shafts 14 and 15 are rotated, the rollers 23 and 24 are constrained to move through definite lateral distances, due to the co-action of the cam faces and the pins. The rollers move in opposite directions during the major portion of any cycle, but due to the angular displacements of the pairs of pins, the motions are in the same direction for short intervals at every half revolution. The rollers have the same angular velocity, and hence, the periods of their linear harmonic motions are the same. The displacements, however, are of different magnitude, since the pairs of cam members 29 and 31, and 34 and 35, have unequal inclinations to the vertical. Likewise, the harmonic motions are always out of phase, by an amount which may be measured in terms of an angle exactly indivisible by 180°. These values may, of course, be altered in view of particular conditions, but they have been found to be desirable for the winding of golf balls.

Secured upon the upwardly projecting and centrally disposed frame member 13 is a block 45, in which is mounted for vertical movement a post 46, having a yoke 47 secured to the lower end thereof. A roller 48, having a concave knurled surface, is rotatably supported between tines 49 of the yoke 47, and it is adapted to bear against a ball core C, disposed upon the rollers 23 and 24, to hold it in position. A yielding pressure is imparted to the roller 48 by means of a lever 51, which is pivotally mounted upon an arm 52 formed on the frame member 13, and which is swivelly connected, as indicated at 53, to the upper end of the post 46. An adjustable counterweight 54 is secured to the outer end of the lever 51, and a spring 55, extending between a boss 56 on the inner arm of the lever and a post 57 on the member 13, serves to impart to the system a resilient pressure.

The machine may be started by pulling forward an operating switch 61, that is automatically controlled to stop the machine by means of a bumper 62, or a control mechanism 63, described in detail in the co-pending application of Edwin G. Templeton, Serial No. 138,794, filed Sept. 30, 1926, and assigned to The Goodyear Tire & Rubber Company.

Rubber thread, which is fed from a reel through a suitable tensioning device, (not shown), is wound upon the core C by the rotation of the rollers 23 and 24, and it is guided thereon by means of a thread guide indicated generally by the reference numeral 65. This member is formed of wire which is bent at about the mid portion of the machine to form a V-shaped guiding channel 67. The ends of the wire may be secured to the bearing housings 11 and 12, and the downwardly projecting portions 68 may be imbedded in the block 10. It has been found that a guide of this character is a valuable contribution to the machine, and that it augments satisfactory operation.

The kinetic aspect of the winding operation appears to be difficult of precise mathematical definition, inasmuch as it includes a plurality of motions. The principal forces and motions producing the ultimate result may be indicated briefly as follows. A rotation of the ball core about a horizontal axis into the plane of the sheet of drawings is produced by the rotation of the rollers 23 and 24 in the same direction. This horizontal axis is revolved into the plane of the sheet of drawings, by the opposed linear motions of the rollers 23 and 24, created by the co-action of the cams and their associated pins.

These two motions have, of course, a more or less determinate resultant, but that resultant does not indicate the true motion of the core nor the direction of application of the winding. The discrepancy is due, to a certain extent, to the drag of the core on the supporting rollers, caused in part by the pressure exerted by the roller 48. Another force is developed by the tension on the thread. Both of these factors cause a gradual displacement of the axes of rotation.

It is to be noted that the rollers 23 and 24 have harmonic motions of different velocities and different amplitudes. As a result, a greater force is imposed upon the core by one roller than by the other, and a further displacement of the axes of rotation is thereby developed. The lateral motions of the rollers are out of phase, by an angle different from 180°. Hence, for two instants of time during the complete revolution, the rollers are moving in the same direction, and this motion produces a momentary countertwist to the ball which also tends to displace the rotative axes. All of these effects combined produce the final result in the wound ball.

A machine having the foregoing characteristics is particularly valuable for the winding of golf balls. Rosebud effects and ellipsoidal deformations are avoided, and hence, a more satisfactory winding is obtained. It has been found that the machine will produce a winding on a softer center than has been employed heretofore, and this is a marked advantage, inasmuch as it eliminates a portion of the expensive preliminary manual winding operation.

While but a single embodiment of a machine incorporating the principles of the invention has been described in detail, it is apparent that those skilled in the art may resort to various modifications without departing from the principles thereof. It is not intended that the scope of the invention should be determined by the correctness of theories advanced with respect thereto, but it is desired that only such limitations be imposed as are set forth in the following claims.

What I claim is:

1. A winding machine comprising a plurality of ball supporting rollers, means to rotate the rollers, and means to reciprocate the respective rollers through different amplitudes.

2. A winding machine comprising a plurality of ball supporting rollers, means to rotate the rollers at the same angular velocity, and means to impart to the respective rollers independent straight line reciprocatory motions of different amplitudes.

3. A winding machine comprising a plurality of ball supporting rollers, means to rotate the rollers, and means to impart harmonic motions to the respective rollers that are measured by the same period but which are of different amplitudes.

4. A winding machine comprising a plurality of ball supporting rollers, means to rotate the rollers, and means to impart to the respective rollers simple harmonic motions that are measured by the same period but which have different amplitudes and which are out of phase with each other.

5. A winding machine comprising a frame, journal bearings in the frame, a plurality of shafts mounted in the bearings, rollers slidably mounted on the shafts, tapered cams adjacent the ends of the rollers, and cam pins projecting from the opposite ends of the rollers adapted to contact with the faces of the cams.

6. A winding machine comprising a frame, oppositely disposed journal bearings in the frame, a plurality of shafts mounted in the bearings, rollers keyed to the shafts, cam pins projecting from opposite faces of the rollers, cylindrical bosses formed with tapered cam faces disposed around the shafts and adapted to contact with the cam pins, means extending between the shafts to rotate them, and means connected to one shaft to effect the rotation of the shafts.

7. A winding machine comprising a pair of ball supporting rollers, means to rotate the rollers at the same angular velocity and cam means to reciprocate the rollers as they revolve, the cams being so formed as to impart a slightly greater reciprocatory movement to one roller than the other.

8. A winding machine comprising a frame, journal bearings in the frame, a plurality of shafts mounted in the bearings, rollers slidably mounted on the shafts, tapered cams adjacent the ends of the rollers, and cam pins projecting from the opposite ends of the rollers adapted to contact with the faces of the cams, portions of the faces of the cams adjacent one roller being spaced farther than the greatest distance between the faces of the cams adjacent the other roller.

9. A winding machine comprising a frame, journal bearings in the frame, a plurality of shafts mounted in the bearings, rollers slidably mounted on the shafts, tapered cams adjacent the ends of the rollers, and cam pins projecting from the opposite ends of the rollers adapted to contact with the faces of the cams, the cams adjacent the ends of one roller being tapered more than the cams adjacent the ends of the other roller.

10. A winding machine comprising a frame, a plurality of shafts journalled on the frame, rollers rotatably mounted on the shafts, cam pins projecting from opposite faces of the rollers, cylindrical bosses formed with tapered cam faces disposed around the shafts and adapted to contact with the cam pins and means for effecting rotation of the shafts.

In witness whereof, I have hereunto signed my name.

JOSEPH P. GRIGGS.